Figure 1:
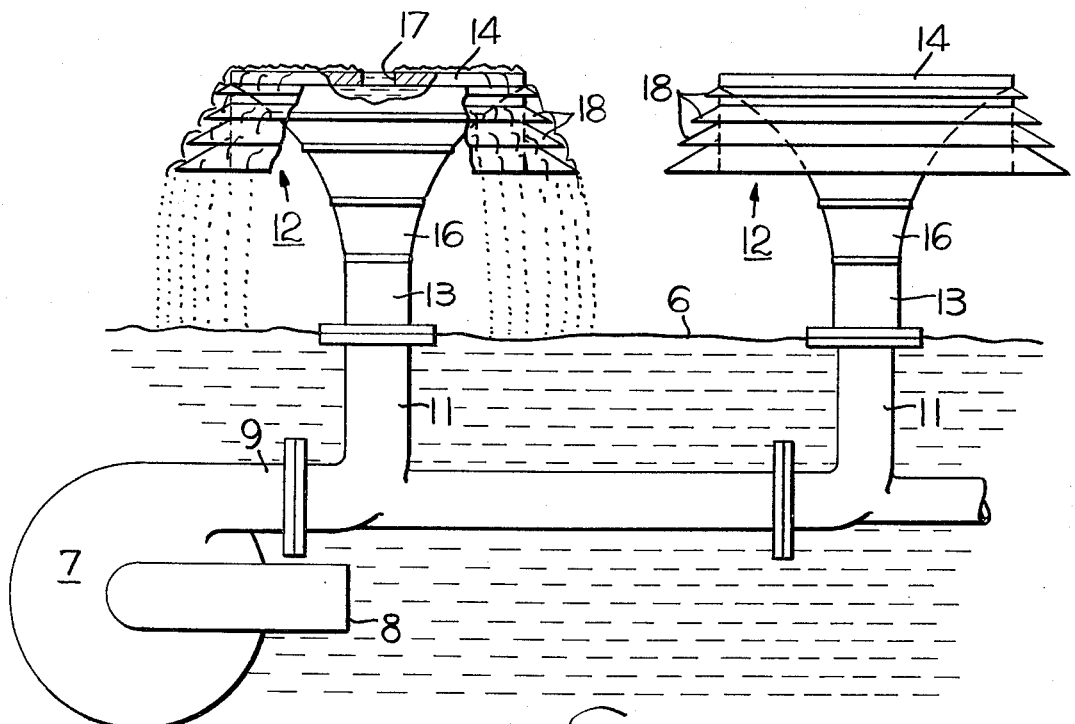

United States Patent [19]
Erickson et al.

[11] 3,921,902
[45] Nov. 25, 1975

[54] COLLAPSIBLE COOLING TOWER

[75] Inventors: Reinhold Barry Erickson; Bruce R. Lipe, both of Cincinnati, Ohio

[73] Assignee: Allis-Chalmers Corporation, Milwaukee, Wis.

[22] Filed: Sept. 30, 1974

[21] Appl. No.: 510,735

[52] U.S. Cl. ............................... 239/17; 239/204
[51] Int. Cl.² ..................... B05B 17/08; B05B 15/10
[58] Field of Search ............... 239/16, 11, 17, 204; 165/15, 45

[56] References Cited
UNITED STATES PATENTS

| | | | |
|---|---|---|---|
| 1,953,518 | 4/1934 | Sweetland | 239/204 |
| 1,958,385 | 5/1934 | Sweetland | 239/204 |
| 3,282,508 | 11/1966 | Roberts | 239/204 |
| 3,307,787 | 3/1967 | Hall, Jr. | 239/17 |
| 3,506,196 | 4/1970 | Ramsey | 239/17 |
| 3,722,816 | 3/1973 | Stewart et al. | 239/204 |

*Primary Examiner*—Lloyd L. King
*Attorney, Agent, or Firm*—John P. Hines

[57] ABSTRACT

A water cooling system wherein collapsible cooling towers are supported above the body of water to be cooled. The cooling towers are composed of collapsible side walls which extend under the influence of the pressurized water being supplied thereto. A plurality of baffles are provided about the upper end of the extended towers and the water supplied to the towers flows over the baffles which divides the water into droplets thereby cooling the water.

4 Claims, 2 Drawing Figures

COLLAPSIBLE COOLING TOWER

This invention pertains in general to water cooling systems and more particularly to such a system which utilizes collapsible towers to cool the water.

BACKGROUND AND SUMMARY OF THE INVENTION

Water is utilized as a cooling agent for many needed processes and most everyone is aware of the serious problem of thermal pollution of water. Power generating plants, particularly of the atomic energy type, require tremendous volumes of water for cooling purposes and Government regulations have become quite strict in controlling the temperature of the water discharged from such plants.

A number of different approaches have been made to cool the water before it is returned to the stream or lake from which it was originally taken. Perhaps the most common type of cooling system is the utilization of cooling towers. Such a system is disclosed in U.S. Pat. No. 3,061,276 issued to R. M. Homan, Oct. 30, 1962.

Another system of cooling water is the spray cooling system, examples of which are shown in U.S. Pat. No. 1,233,119 issued to L. H. Parker July 10, 1917 and U.S. Pat. No. 3,622,074 issued to Paul A. Frohwerk, Nov. 23, 1971.

Both of these systems have advantages and disadvantages. Cooling towers are relatively efficient from a horsepower requirement standpoint and can be erected in congested locations because of the relatively slight amount of water drift. However, cooling towers are quite expensive to erect and to maintain. On the other hand, while spray cooling is considerably less expensive to install, it does have the drawback of water drift under windy conditions. Therefore, spray cooling ponds are not susceptible to installation in highly congested areas. Furthermore, it requires more horsepower to spray water to a given height than is required to pump the same amount of water to the same height such as in a cooling tower.

It is the intention of this invention to provide a water cooling system which utilizes the advantages of both the spray cooling method and the cooling tower method of water cooling.

It is therefore the main object of this invention to provide a water cooling system including water cooling towers which are extendable under the influence of the pressure of the water supplied thereto for cooling purposes and which are collapsible under their own weight when no water is supplied thereto.

Another object of the subject invention is to provide a water cooling system of the hereinbefore described type wherein baffles are provided in the water flow path as it falls from the cooling tower to divide the water into droplets and thereby improve cooling.

A more specific object of the subject invention is to provide a water cooling system of the hereinbefore described type wherein the cooling tower assumes a hyperbolic shape when in the extended position.

Figure 2:
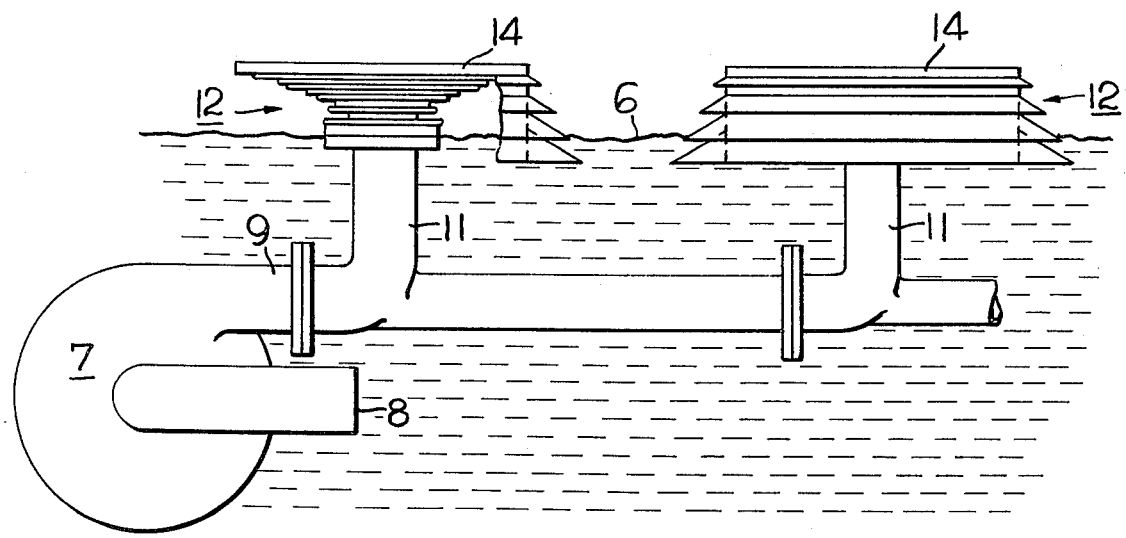

These and other objects of the subject invention will become more fully apparent as the following description is read in light of the attached drawing wherein:

FIG. 1 is a side elevation partly in section of a water cooling system constructed in accordance with the invention with the collapsible cooling towers in the extended position; and FIG. 2 is a side elevation of a water cooling system constructed in accordance with the invention wherein the cooling towers are shown in the collapsed position.

Referring to the drawings, item 6 indicates a body of water or liquid to be cooled. This body of water may be a moving stream, a pond or a lake. Means for pressurizing the water are provided such as a pump indicated at 7. The pump is provided with an inlet 8 drawing water from the pond 6.

The pump discharge 9 is herein shown for purposes of illustration connected to piping 11 which in turn supports the collapsible cooling towers generally indicated 12. It should be understood that while this modification of the invention shows the piping 11 supporting the cooling towers 12 each tower and its connected piping could be supported on floats without departing from the spirit of the invention.

The collapsible cooling towers 12 are provided with an inlet end 13 and an outlet end wall 14. Collapsible side walls 16 connect the inlet end 13 and the outlet end wall 14. These side walls may be constructed of a fabric-like material or may be constructed of rigid telescoping elements as are herein shown for purposes of illustration. A discharge opening 17 is provided in the outlet end wall 14.

A plurality of baffles 18 are provided about and connected to the end wall 14. These baffles may be constructed in any convenient manner to insure that the water flowing thereon is divided into droplets.

During operation the pump 7 pressurizes the water and delivers it to the cooling towers 12. The force of the water acting on the end wall 14 causes the cooling tower to extend to the position shown in FIG. 1. Depending on the size of the pump, the cooling towers may be extended to approximately 15 to 20 feet above the surface of the pond 6. Once extended, water passes through the discharge opening 14 and flows over the baffles 18 back to the pond 6. During this process the water is divided into droplets and is cooled. When the cooling system is not in operation, the pump is shut off and the cooling towers collapse under their own weight to the position shown in FIG. 2.

It should be noted that in the preferred embodiment shown herein for purposes of illustration, the cooling towers are hyperbolic in shape when in the extended position. This arrangement is preferred so that a large force can be exerted on the outlet end wall 14 without requiring the pump to support a column of water equal to the diameter of the outlet end wall.

From the above description it can be seen that the subject invention does exhibit the desirable characteristics of both cooling towers and spray cooling systems but has overcome the shortcomings of both. This system can be constructed relatively inexpensively and provided directly in the body of water to be cooled. Furthermore, the problem of spray drift has been overcome. Additionally, because of the collapsible feature, if excessively high winds are present the system can be turned off permitting the cooling towers to collapse to prevent damage to the system.

The embodiment of the invention in which an exclusive property or privilege is claimed is defined as follows:

1. A system for cooling a body of liquid, comprising in combination:

a liquid discharge member including an inlet end and an outlet end wall, selectively extendable and collapsible side walls joining said ends constructed and arranged such that the weight of said side walls and said outlet end wall will cause said member to collapse;

means supporting said liquid discharge member above said body of liquid;

liquid pressurizing means;

means connecting said liquid pressurizing means to said inlet end of said liquid discharge member; and walls defining a liquid discharge opening through said outlet end wall, said discharge opening being of a predetermined size such that said liquid cooling member will extend substantially vertically above said body of liquid under the influence of the pressurized liquid supplied thereto and the liquid will flow from said discharge opening and fall back to said body of liquid and in the process be cooled.

2. The system set forth in claim 1 and further comprising baffles connected to said discharge member constructed and arranged to cause the liquid flowing from said discharge opening to flow over said baffles and divide same into droplets to aid in the cooling of said liquid.

3. The system set forth in claim 1 wherein the surface area of said outlet end wall is substantially larger than the cross-sectional area of said inlet.

4. The system set forth in claim 3 wherein said member is hyperbolic in shape when in the extended position.

* * * * *